United States Patent [19]
Howell

[11] Patent Number: 5,903,223
[45] Date of Patent: May 11, 1999

[54] HUMIDIFIER CONTROL SYSTEM

[75] Inventor: E. Keith Howell, Hendersonville, N.C.

[73] Assignee: Dampp-Chaser Electronics Corporation, Hendersonville, N.C.

[21] Appl. No.: 08/845,985

[22] Filed: May 1, 1997

[51] Int. Cl.⁶ .................................................. G08B 21/00
[52] U.S. Cl. ............................ 340/620; 84/453; 261/104
[58] Field of Search .................................. 340/620, 604, 340/618, 612, 603; 84/453; 261/104, 72.1

[56] References Cited

U.S. PATENT DOCUMENTS

| | | | |
|---|---|---|---|
| 2,600,659 | 6/1952 | Koch, Jr. ................................. | 340/623 |
| 3,304,066 | 2/1967 | Vieceli et al. ............................ | 261/29 |
| 3,339,578 | 9/1967 | Smith ..................................... | 340/620 |
| 3,580,158 | 5/1971 | Scholle et al. .......................... | 118/694 |
| 4,150,372 | 4/1979 | Foote ..................................... | 340/620 |
| 4,796,017 | 1/1989 | Merenda ................................ | 340/620 |
| 5,428,347 | 6/1995 | Barron ................................... | 340/620 |
| 5,428,348 | 6/1995 | Gault ..................................... | 340/618 |
| 5,625,345 | 4/1997 | Stark et al. ............................. | 340/620 |

*Primary Examiner*—Jeffery A. Hofsass
*Assistant Examiner*—Sihong Huang
*Attorney, Agent, or Firm*—Carter & Schnedler

[57] ABSTRACT

There is provided a humidifier control system including a water reservoir having a top opening. A pair of wicking pads extend into the reservoir and around a tube which extends over the top opening. An electrical heating element is received inside the tube. First and second spaced apart moisture sensor elements are attached to the tube and are in contact with the wicking pads. The sensor elements conduct electricity in the presence of moisture on the wicking pads and do not conduct electricity in the absence of moisture on the wicking pads. The sensor elements are attached to an electrical circuit which includes a switch and an alarm. When there is moisture on the wicking pads, the switch is on and normal current flows through the heating element and the switch. When there is not moisture on the wicking pads, the switch is turned off and the current through the heating element is reduced to a minimal level, and the alarm is turned on.

8 Claims, 4 Drawing Sheets

HUMIDIFIER CONTROL SYSTEM

BACKGROUND OF THE INVENTION

This invention relates to humidifiers which utilize electrical heaters in the humidification process. More particularly, it relates to control systems for electric humidifiers.

Humidifiers are used to add moisture to the air, particularly during the heating season when heating systems greatly reduce the humidity. Various items, such as pianos, require a precisely controlled humidity in order to function properly. Piano humidifiers are commercially available from Dampp-Chaser Electronics Corporation, assignee of the present invention. Dampp-Chaser humidifiers utilize a water reservoir and a heating rod with a pair of wicking pads contacting the heating rod and the water inside the reservoir. It is desirable for the user of the humidifier to determine whether or not there is sufficient water in the reservoir and to control the humidifier heater. U.S. Pat. No. 4,150,372, issued to Allen Foote, teaches the use of a neon light to indicate the fact that the water in the reservoir is low. However, the Foote patent does not teach a technique for turning off the humidifier when the water in the reservoir is low. The present invention represents an improvement over the teachings of the Foote patent. If the heating rod continues to operate after the water reservoir is dry, or after the pads cease wicking, the air is heated by the rod without evaporating water, thereby reducing humidity, which is directly opposite to the purpose of the humidifier. Prolonged operation without water causes a drying affect, which is counterproductive and has a deleterious action. When minerals, molds and fungus collect on the pads, the pads cease wicking.

OBJECTS OF THE INVENTION

It is therefore one object of this invention to provide an improved humidifier.

It is another object of this invention to provide an improved control system for a humidifier.

It is also another object of this invention to prevent operation of a humidifier in the absence of water in the humidifier.

It is still another object of this invention to provide an improved electrical circuit for indicating the absence of water in a humidifier.

It is yet another object of this invention to provide a circuit for controlling a humidifier heater and indicating the lack of water in contact with the humidifier heater.

SUMMARY OF THE INVENTION

In accordance with one form of this invention, there is provided a humidifier including a water reservoir and having a top opening. At least one wicking element extends into the reservoir. A tube extends over the top opening. At least one electrical heating element is received in the tube. First and second moisture sensor elements are attached to the tube. The wicking element is received over the tube and contacts the first and second sensor elements. The sensor elements conduct electricity in the presence of moisture on the wicking element and do not conduct electricity in the absence of moisture on the wicking element.

The humidifier further includes an electrical circuit. The sensor elements and heating element are connected to the electrical circuit. The circuit includes a switch and preferably includes an alarm. The switch turns off the heating element and turns on the alarm, if the alarm is included, when moisture is absent from the wicking element, and turns on the heating element and turns off the alarm, if the alarm is included, when there is moisture present on the wicking element.

In accordance with another form of this invention, there is provided an electrical circuit for controlling a heating element and for indicating a low level of water in a humidifier. First and second electrically conductive moisture sensor elements are provided. Current will flow between the sensor elements in the presence of moisture and will not flow between the sensor elements in the absence of moisture. An alarm is connected to a voltage source. A switch is connected to at least one of the sensor elements. A humidifying heater is provided. The heater is connected to the switch and to a voltage source. When the switch is on, high current flows through the heater and the switch bypasses the alarm. When the switch is off, current will flow to the alarm, thereby indicating a low level of water, and only a minimal amount of current will flow through the heating element, thereby turning off the heating element.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 1:
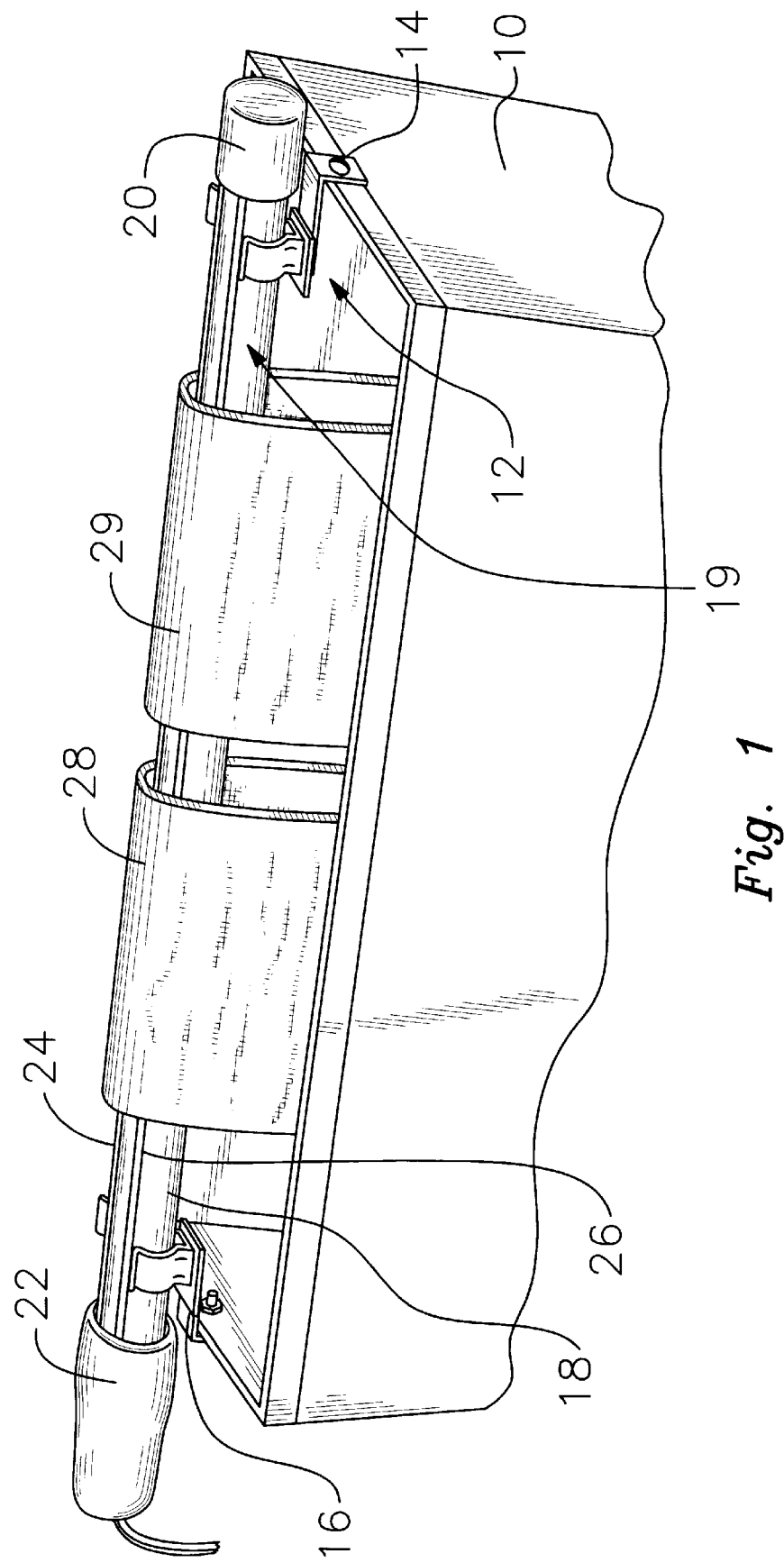
FIG. 1 is a partial pictorial view showing an apparatus of the subject invention.

Referring now more particularly to FIG. 1, there is provided water tank 10 having a top opening 12. A pair of mounting brackets 14 and 16 are attached to the sides of the tank. Aluminum heater tube 18 is attached to brackets 14 and 16 so that the heater tube extends over top opening 12 of the water tank. Insulator caps 20 and 22 are attached to the respective ends of heater tube 18. Heater tube 18 is surrounded by an insulating film 19. A pair of moisture sensor elements in the form of metal rods 24 and 26 are attached to the top of the tube over the film 19 and are spaced apart from one another.

A pair of wicking pads 28 and 29 are laid across heater tube 18 and come into contact with sensor rods 24 and 26. The wicking pads are designed to wick water from the tank up to the tops of the pads to provide moisture for the humidification process. That is, heat from the heater tube causes the wicking pads to heat up, thereby evaporating the moisture on the pads. In addition, moisture in the wicking pads create a short circuit across the sensor rods 24 and 26.

Figure 2:
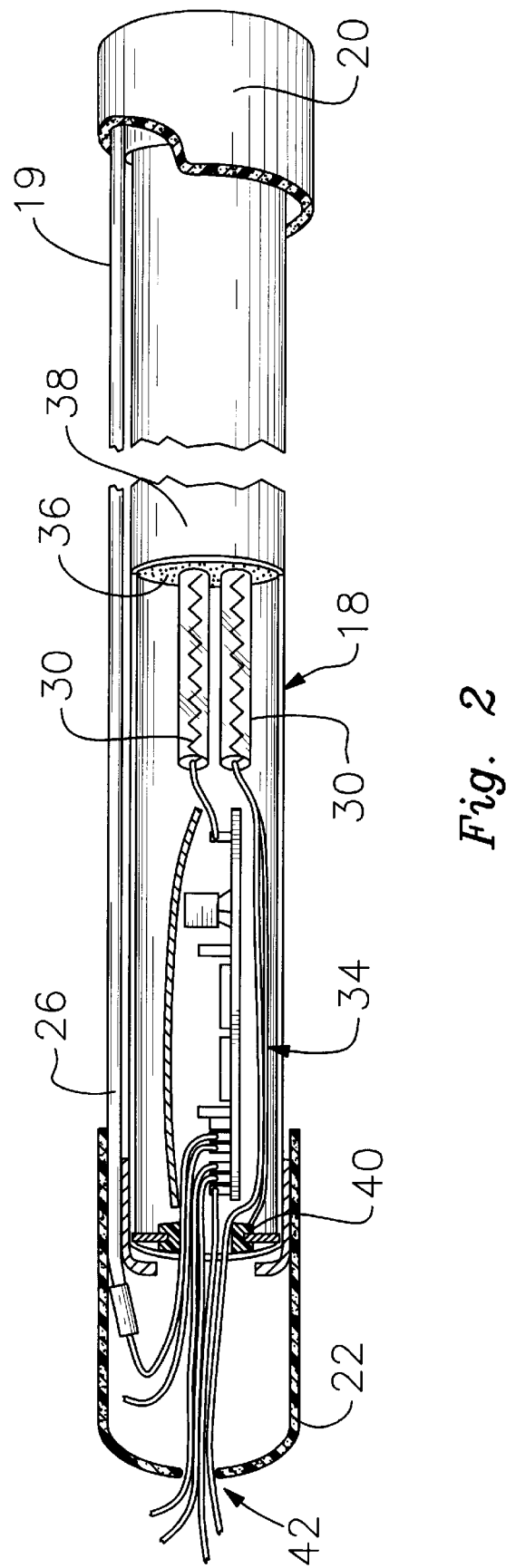
FIG. 2 is a partial side elevational view of the heater tube of the subject invention with portions removed.

Referring now more particularly to FIG. 2, heater tube 18 has a resistance heating element 30 and an electrical control circuit 34 received therein. Heating element 30 is connected to circuit 34. The heating element is embedded in insulating granular fill 36.

Electrical conductors which are attached to circuit 34 extend through a strain relief bushing 40 and some of the conductors exit the heater assembly through opening 42 in insulator cap 22.

Figure 3:
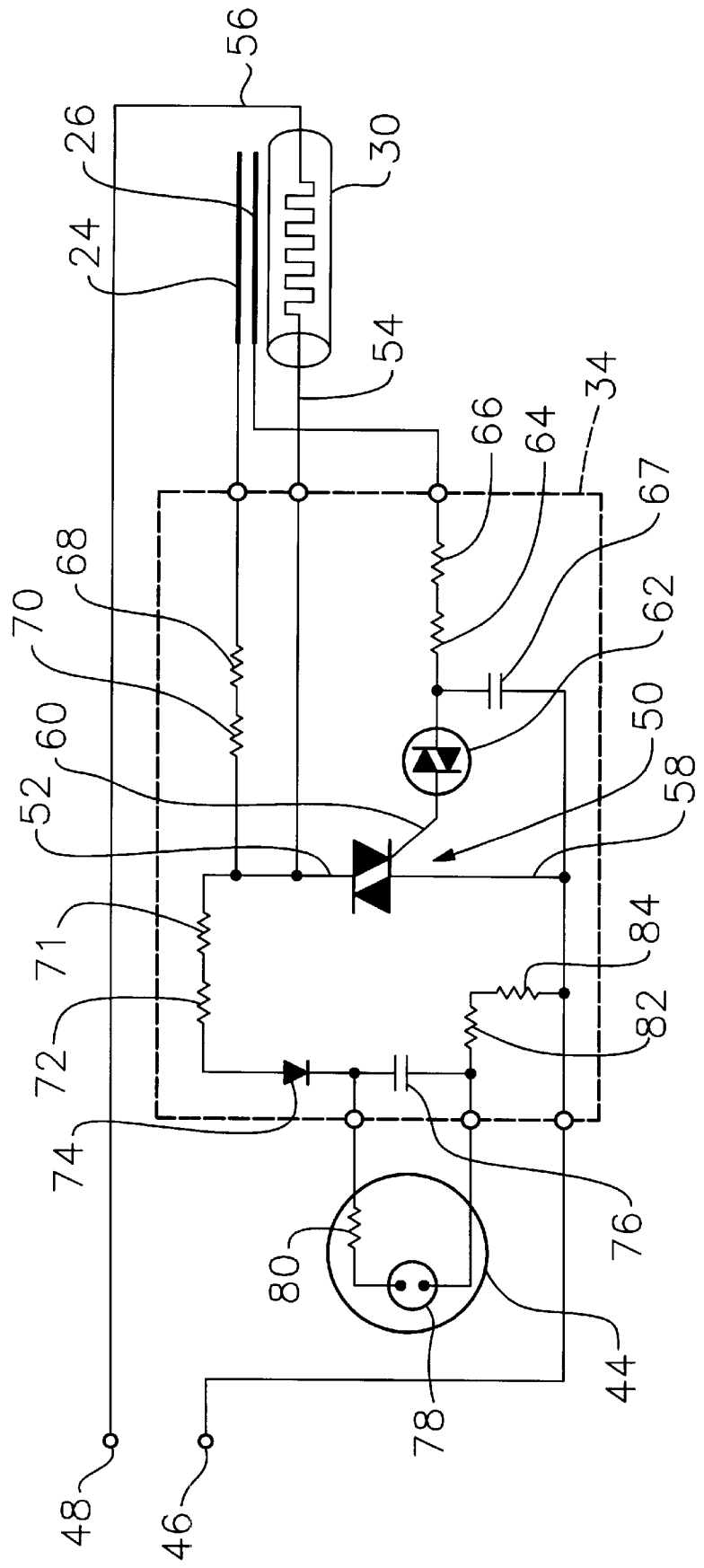
FIG. 3 is a schematic circuit diagram showing an electrical circuit of the subject invention.

Referring now more particularly to FIG. 3, there is provided control circuit 34 which is attached to moisture sensor rods 24 and 26, to humidifying heater 30, to lamp assembly 44 and to one terminal 46 of a 120 volt AC voltage source. Circuit 34 includes a triac 50 which functions as a switch. A first main terminal 58 of triac 50 is connected to terminal 46 of the 120 volt AC voltage source. A second main terminal 52 of triac 50 is connected to terminal 54 of heater 30. Terminal 56 of heater 30 is connected to terminal 48 of the 120 volt AC voltage source.

Gate 60 of triac 50 is connected to a semi-conductor bilateral switch triggering device 62, such as a diac, which, in turn, is connected to resistors 64 and 66. Resistor 66 is connected to moisture sensor rod 26. Diac 62 is also connected to terminal 46 of the 120 volt AC voltage source through capacitor 67. The other moisture sensor rod 24 is connected to resistors 68 and 70. Resistor 70 is connected to main terminal 52 of triac 50. When there is moisture present on sensor rods 24 and 26, current flows between the rods and charges capacitor 67, and when the threshold voltage of diac 62 is reached, the capacitor 67 is discharged through diac 62, and triac 50 is gated on and normal current flows through heater 30 and through the triac.

Terminal 54 of heater 30 is also connected to resistor 71 which, in turn, is connected in series to resistor 72. Resistor 72 is connected to diode 74 which, in turn, is connected to capacitor 76.

Lamp assembly 44 includes neon lamp 78 which is connected to resistor 80. Capacitor 76 is connected across neon lamp 78 and resistor 80. Capacitor 76 is also connected to resistor 82 which, in turn, is connected to resistor 84. Resistor 84 is connected to terminal 46 of the 120 volt AC voltage source. Resistor 84 is also connected to main terminal 58 of triac 50. When triac 50 is on, it effectively shorts out the circuit which includes the lamp assembly 44. However, when triac 50 is off, a very low level of current will flow through heater 30 through resistors 71, 72, 82 and 84, and diode 74 to charge capacitor 76. Capacitor 76 will discharge through the neon lamp 78 when the threshold voltage of the neon lamp 78 is reached, thereby creating a repetitive flash. Triac 50 is not gated on when there is a lack of moisture between the moisture sensor rods 24 and 26.

The humidifier heater control apparatus utilizing the circuit shown in FIG. 3 operates as set forth below. Water is added to tank 10. Water is wicked up to the top of heater tube 18 through wicking pads 28 and 29. The moisture at the top of the wicking pads creates a short circuit between sensor rods 24 and 26 causing current to flow between the sensor rods through resistors 64 and 66 through diac 62 to gate on triac 50. High current will flow from terminal 48 of the 120 volt AC voltage source through heater 30 through main terminal 52 of triac 50 to main terminal 58 of triac 50 and to terminal 46 of the 120 volt AC voltage source. Humidity is added to the air due to the heating of wet wicking pads, thereby evaporating the water on the pads. During that period, current does not flow to the lamp assembly 44.

When the tops of wicking pads 28 and 29 become dry, which normally occurs because the water in tank 10 is low, current will not flow between moisture sensor rods 24 and 26. Therefore, triac 50 is not gated on. Due to the high impedance of resistors 71 and 72, a low current will flow through heater 30 through resistors 71 and 72 to charge capacitor 76 which, as stated previously, will discharge through the lamp assembly 44 causing neon lamp 78 to flash. The user of the humidifier will then see that the pads are dry and will take action to correct the situation, such as filling the tank.

Resistors 71 and 72 are high impedance resistors, such as 130 kilo ohms each, so that the current flow through heater 30 is minimal when triac 50 is off and lamp assembly 44 is on.

The circuit of FIG. 3 described above not only will provide a visual indication that the wicking pads are dry, but will also effectively shut down the heater while there is insufficient water reaching the heating element for the humidifier to operate properly.

Figure 4:
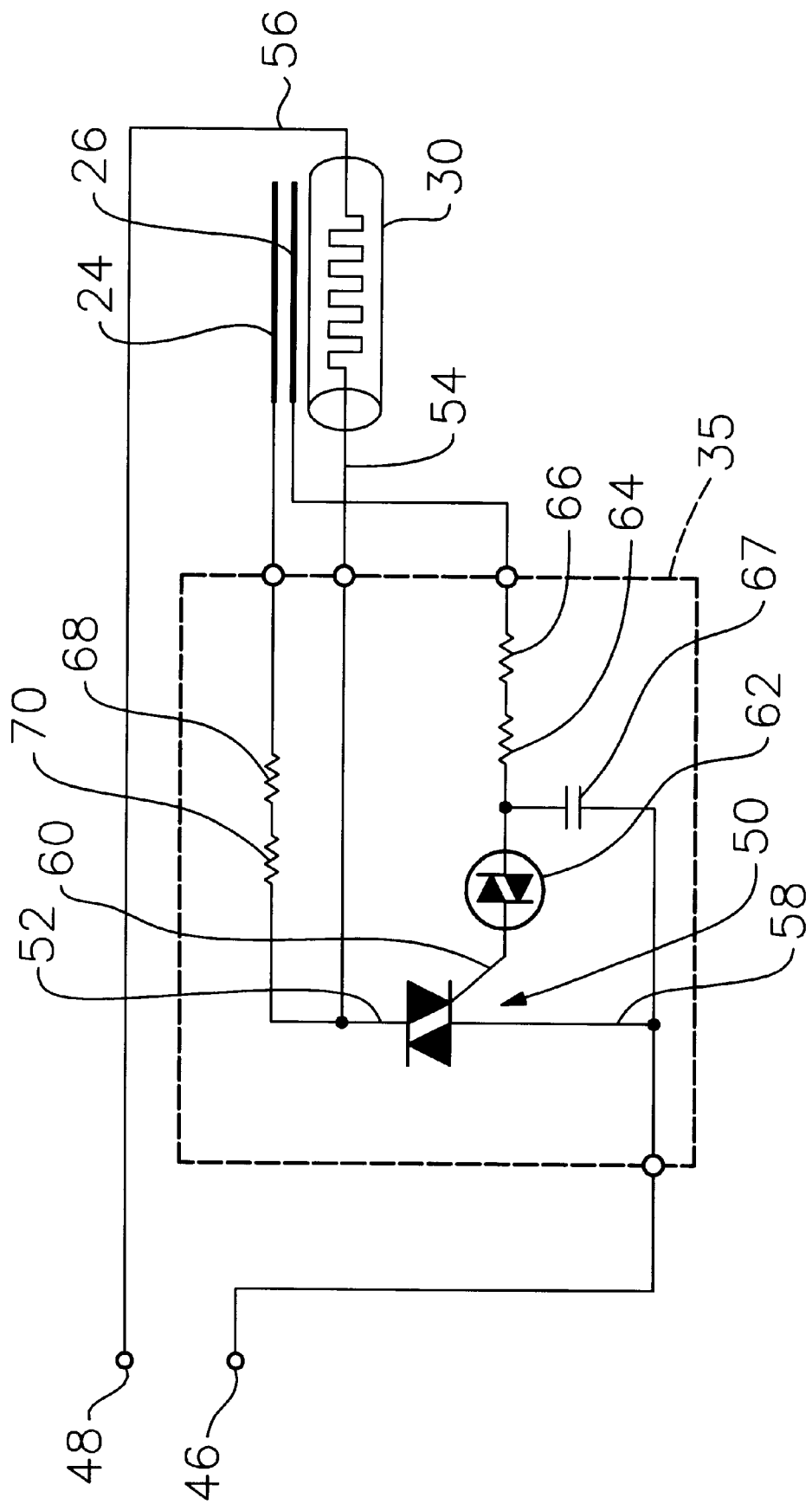
FIG. 4 is a schematic circuit diagram showing an alternative embodiment of an electrical circuit of the subject invention.

FIG. 4 shows an alternative embodiment to the circuit shown in FIG. 3. FIG. 4 provides controls for the current through heater 30, but does not include the low water alarm feature of FIG. 3. That is, the circuit 35 of FIG. 4 is identical to circuit 34 of FIG. 3, except that resistors 71, 72, 82 and 84, and diode 74 and capacitor 76, all of which are used to control the lamp assembly 44, have been eliminated. Except for the operation of the lamp assembly, the circuit 35 will operate the same as circuit 34 described above.

From the foregoing description of the preferred embodiment of the invention, it will be apparent that many modifications may be made therein. It will be understood, however, that the embodiment of the invention is an exemplification of the invention only and that the invention is not limited thereto. It is to be understood, therefore, that it is intended in the appended claims to cover all modifications as fall within the true spirit and scope of the invention.

I claim:

1. A humidifier comprising:

a water reservoir including a top opening;

at least one wicking element extending into said reservoir;

a hollow tube extending over said top opening;

at least one electrical heating element received inside said hollow tube;

first and second moisture sensor elements attached to said hollow tube; said wicking element received over said hollow tube and contacting said first and second sensor elements; said sensor elements conducting electricity in the presence of moisture on said wicking element and not conducting electricity in the absence of moisture on said wicking element;

an electrical circuit; said sensor elements and said heating element connected to said electrical circuit; said circuit including a switch and an alarm; said switch turning on said alarm when moisture is absent on said wicking element and turning off said alarm when moisture is present on said wicking element; said switch turning on said heating element when moisture is present on said wicking element and turning off said heating element when moisture is absent for said wicking element.

2. A humidifier as set forth in claim 1, wherein high current will flow through said heating element when said switch is on and minimal current will flow through said heating element when said switch is off.

3. A humidifier as set forth in claim 2, wherein said switch is a semi-conductor device.

4. A humidifier as set forth in claim 3, wherein said semi-conductor device is a triac; said triac having first and second main terminals and a gate terminal; one of said sensor elements being connected to said gate terminal of said triac.

5. A humidifier as set forth in claim 4, further including a semiconductor bilateral switch triggering device connected between said one of said sensor elements and said gate terminal.

6. A humidifier as set forth in claim 1, wherein said alarm is a lamp assembly.

7. A humidifier as set forth in claim 6, wherein said lamp assembly includes a neon lamp; a capacitor connected to said neon lamp; said capacitor being charged when said switch is off; said capacitor discharging through said neon lamp, thereby flashing said neon lamp indicating the absence of moisture between said sensor elements.

8. A humidifier as set forth in claim 6, further including a high impedance connected between said lamp assembly and said heating element.

\* \* \* \* \*